March 28, 1939.   P. SCHOENMAKER   2,152,286
WELDING ROD
Filed Aug. 16, 1937
INVENTOR
PIETER SCHOENMAKER
BY
ATTORNEY Patented Mar. 28, 1939

2,152,286

UNITED STATES PATENT OFFICE 2,152,286

WELDING ROD

Pieter Schoenmaker, Nijmegen, Netherlands, assignor to Willem Smit & Co's Transformatorenfabriek, Nijmegen, Netherlands Application August 16, 1937, Serial No. 159,392
In the Netherlands November 4, 1936

4 Claims. (Cl. 219—8)

My invention relates to coated welding rods, and more particularly to the use of organic substances with slag-forming coating materials containing free $SiO_2$, a metal oxide which splits off oxygen, and manganese or ferro-manganese.

As is well known, the quality of electric arc welds can be materially improved by using welding rods provided with slag-forming coatings, and various mixtures have been proposed for this purpose. For instance, it has been proposed to use mixtures containing a metal oxide which splits off oxygen during welding, and manganese or ferro-manganese, and it has also been proposed to add an organic substance to produce, during the welding, a reducing gas atmosphere which helps to protect the flowing hot metal drops from the action of the air.

The main object of my invention is to provide an improved coating material of the above type.

In accordance with the present invention I use a coating material whose composition satisfies the following conditions:

1. The ratio of the number of gram-molecules of free $SiO_2$ to the number of gram-molecules of metal oxide which splits off oxygen and which is derived, at least to 80% by weight, from iron, lies between 3.5 and 1.
2. A quantity by weight of manganese or ferro-manganese which is capable of combining with all the oxygen susceptible of being split off.
3. From 10% to 20% by weight of non-melting carbohydrates.

I am aware that the British patent specification No. 425,443 dated July 13, 1933, discloses a coating mass of the general type of the present invention; however it contains only about 8% by weight of a mixture of determined organic substances. Furthermore, this patent states that an excessive amount of organic substances gives rise to the production of a porous weld. However, I have found that it is possible to use a fairly high percentage by weight of a non-melting carbohydrate, such as flour, provided care is taken to ensure that the slag produced has a sufficient content of lower oxide of metals of the type referred to above under point 1.

The coating materials according to the invention may be applied as a comparatively thin coating on the welding rod, while at the same time it is possible to obtain a weld which is at least as strong as those produced when using any known coating material. Because of this, bigger metal drops may be obtained, which is of advantage in making certain types of welds. Furthermore, welding rods provided with coating masses according to the invention may be readily manufactured in mass production by the so-called pressing or extrusion methods.

In order that the invention may be clearly understood and readily carried into effect, I shall describe the same in more detail with reference to the accompanying drawing, in which the single figure is a plan view of a welding rod provided with a coating according to the invention.

The welding rod shown in the drawing comprises a core 1 of welding material such as steel, provided with a coating 2. In accordance with the invention the coating 2 may have, for example, the following two compositions:

|  | Parts by weight | |
| --- | --- | --- |
|  | #1 | #2 |
| Flour | 15 | 30 |
| Dextrine | 15 | 5 |
| Quartz | 60 | 50 |
| Higher oxide of iron (magnetite, 90%) | 105 | 90 |
| Ferro-manganese (80% Mn) | 35 | 35 |
| $SiO_2$ from waterglass | 8.5 | 10.5 |

A small proportion of the higher oxide of iron may be replaced by other metal oxides by which oxygen is split off such as titanium dioxide manganese dioxide, and the like which is known in the art. Furthermore, part of the free $SiO_2$ may be replaced by $SiO_2$ in a combined state, for example kaolin. When using organic substances, such as sawdust and flour, I prefer to use partly carbohydrates which give the coating mass the proper consistency; for example dextrine is very suitable for this purpose.

While I have described my invention with reference to specific examples, I do not wish to be limited thereto, but desire the appended claims to be construed as broadly as permissible in view of the prior art.

What I claim is:

1. A slag-forming coating material for welding rods comprising an organic substance, free $SiO_2$, a metal oxide by which oxygen is split off, and manganese or ferro-manganese, said material satisfying the following conditions (1) the ratio of the number of gram-molecules of free $SiO_2$ to the number of gram-molecules of metal oxide by which oxygen is split off and which is derived at least to 80% by weight from iron, lying between 3.5 and 1, (2) at least a quantity by weight of manganese or ferro-manganese which is capable of combining with all the oxygen which is susceptible of being split off, and (3) from 10 to 20% by weight of non-melting carbohydrates.

2. A slag-forming coating material for welding rods comprising free $SiO_2$, a metal oxide by which oxygen is split off and which is derived at least 80% by weight from iron, the ratio of the number of gram-molecules of the $SiO_2$ to the number of gram-molecules of the metal oxide lying between 3.5 and 1, sufficient manganese or ferro-manganese to combine with all the oxygen susceptible of being split off, and from 10% to 20% of non-melting carbohydrates.

3. A slag-forming coating material for welding rods comprising by weight 15 parts flour, 15 parts dextrine, 60 parts quartz, 105 parts higher oxide of iron (90%), 35 parts ferro-manganese (80% Mn), and 8.5 parts $SiO_2$ from waterglass.

4. A slag-forming coating material for welding rods comprising by weight, 30 parts flour, 5 parts dextrine, 50 parts quartz, 90 parts higher oxide of iron (90%), 35 parts ferro-manganese (80% Mn), and 10.5 parts $SiO_2$ from waterglass.

PIETER SCHOENMAKER.